(12) United States Patent
Osaka (10) Patent No.: US 6,792,253 B2
(45) Date of Patent: Sep. 14, 2004

(54) RADIO RECEIVER FOR DISPLAYING INPUT LEVEL AND DISPLAY METHOD THEREOF

(75) Inventor: Masahiko Osaka, Saitama (JP)

(73) Assignee: NEC Corporation, Tokyo (JP)

( * ) Notice: Subject to any disclaimer, the term of this patent is extended or adjusted under 35 U.S.C. 154(b) by 576 days.

(21) Appl. No.: 09/777,236

(22) Filed: Feb. 5, 2001

(65) Prior Publication Data

US 2001/0012763 A1 Aug. 9, 2001

(30) Foreign Application Priority Data

Feb. 8, 2000 (JP) ........................................ 2000-030151

(51) Int. Cl.[7] .............................................. H04B 17/00
(52) U.S. Cl. ................................... 455/226.4; 455/67.7
(58) Field of Search ........................ 455/226.1, 226.2, 455/226.4, 67.11, 67.7, 566

(56) References Cited

U.S. PATENT DOCUMENTS 5,507,022 A * 4/1996 Uomoto ................... 455/226.2

FOREIGN PATENT DOCUMENTS

| JP | 11-055138 | 2/1999 | ............ H04B/1/18 |
| WO | WO 99/18683 A2 | 4/1999 | ........... H04B/17/00 |

* cited by examiner

*Primary Examiner*—Lee Nguyen
(74) *Attorney, Agent, or Firm*—Michael Best & Friedrich LLP (57) ABSTRACT

Electric fields A, B and C are inputted to an antenna 20, and corresponding digital values AAD, BAD and CAD obtained from an A/D converter are stored in memories A6, B7 and D12, respectively. An operational circuit 9 obtains a non-linearity corrected input power level conversion table from the input power levels of the electric fields A, B and C and the corresponding digital values AAD, BAD and CAD, and stores the obtained table in a memory C8. The electric field C is the electric field under which the receiver circuit is not linearly operated. A controller reads out the input power level at the time of input of each electric field from the memory C8, and displays the read-out input power level on a input power level display 10. Thus, adverse effects, on linearity, of saturation caused by high input power level electric field input to an antenna or of noise at the time of low input power level electric field input are improved.

6 Claims, 6 Drawing Sheets

(Prior Art)

RADIO RECEIVER FOR DISPLAYING INPUT LEVEL AND DISPLAY METHOD THEREOF

BACKGROUND OF THE INVENTION

This application claims benefit of Japanese Patent Application No. 2000-030151 filed on Feb. 8, 2000, the contents of which are incorporated by the reference.

The present invention relates to radio receivers for portable telephone sets or the like having input power level display for detecting and displaying input power level in such sets, and also to methods of such input power level display.

Radio receivers for receiving radio waves find extensive applications due to their relatively broad service area coverage and relatively inexpensive cost. Portable telephone sets are typical example of such radio receivers. For communication, portable telephone sets receive radio waves from one or more relay stations provided in such service area or areas. However, the distance of a portable telephone set from a relay station or the transmission (output) and receipt (input) wave power levels in the set is not constant. For example, the input or receipt power level of wave varies greatly depending on various conditions.

Such a portable telephone set (or radio communication set) accordingly has a function of detecting the input power level and displays the detected level on a input power level display. In a usual input power level display, a voltage corresponding to the input power level is detected by using a circuit for converting the input power level to a corresponding voltage, for instance, a current drive log amplifier (or logarithmic amplifier). The receiver circuit is controlled on the basis of the detected voltage of the log amplifier. A method of such display control, is an analog display control or adjustment method, in which a control circuit constituted by an analog circuit having an operational amplifier or the like, is used such that the gain and/or off-set voltage of the operational amplifier is controlled while monitoring the voltage corresponding to the input power level. Another type of display control or adjust method is a digital display control method, in which the display is controlled on the basis of the data obtained form an A/D (analog-to-digital) converter without any analog control circuit. Generally, when the input power level is high, i.e., at high input power level electric field, characteristics of an intermediate frequency amplifier (i.e., IF amplifier), a mixer, etc. are subject to distortions due to the characteristics of circuit elements up to input power level conversion to corresponding voltage. Also, IF filter employed has such band characteristics as to have adverse effects of giving rise to a correct input power level display failure trend with an input electric field level even in excess of a certain level. However, the detected input power level display adjustment should be executed such that linearity is obtainable in a certain prescribed input electric field level range. As prior art technique example, Japanese Patent Laid-Open No. 11-55138 discloses "Receiver". In this example, a received signal processing circuit that is used includes a variable attenuator. The variable attenuator is adapted to maintain linearity by increasing the attenuation at high input power level electric field reception time.

Figure 5:
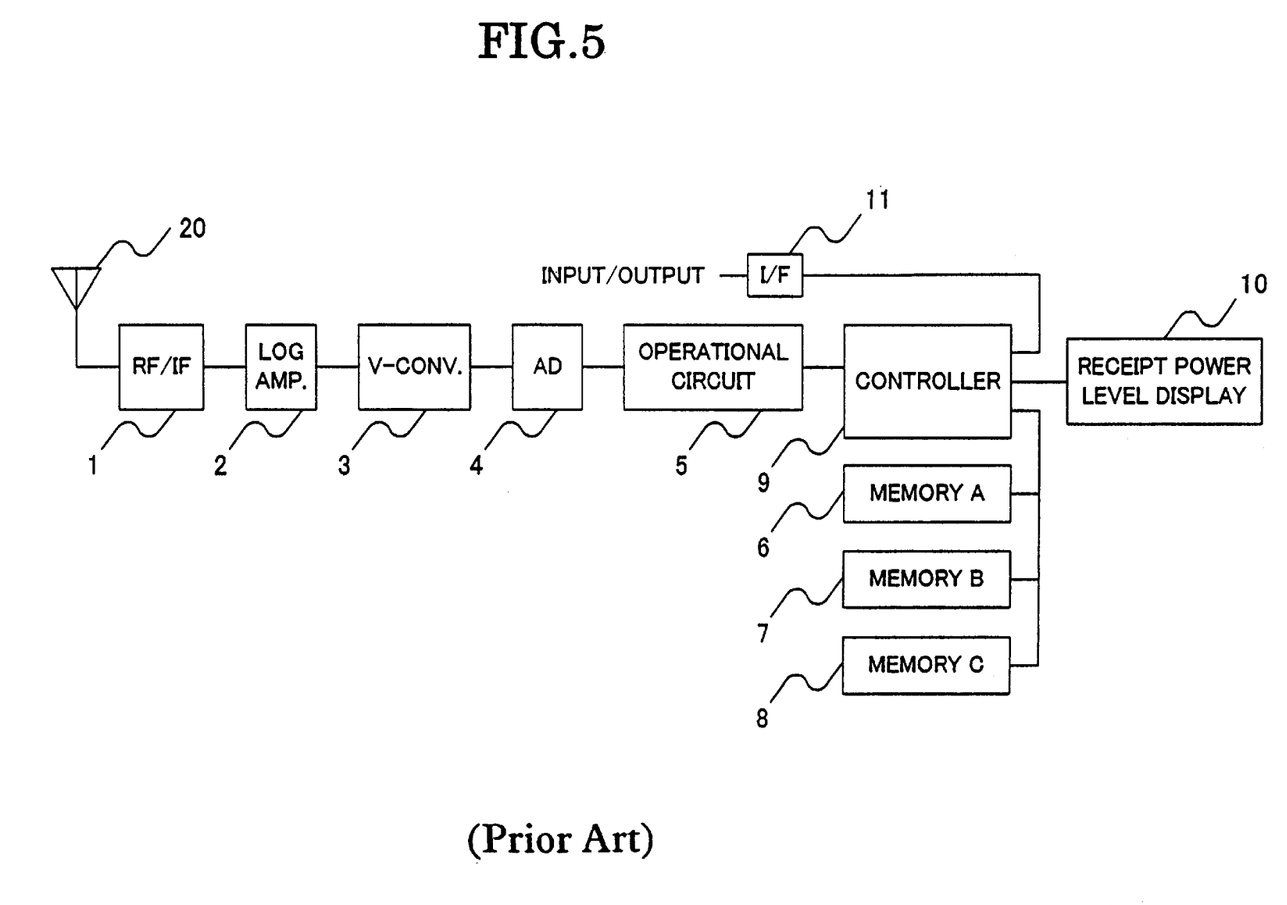
FIG. 5 is a block diagram showing the construction of a prior art radio receiver.

FIG. 5 is a block diagram showing the construction of a usual radio receiver. This radio receiver comprises a radio frequency/intermediate frequency (RF/IF) circuit 1 connected to an antenna (or antenna terminal) 20 for receiving radio wave, a log amplifier 2, a voltage converter 3, an A/D converter 4, an operational circuit 5, a memory A6, a B7, a C8, a controller 9, a detected input power level display 10 and an interface (I/F) 11. The RF/IF 1 amplifies an RF signal from the antenna 20, frequency converts the amplified signal to an i-f signal and further amplifies the IF signal with a predetermined gain. The log amplifier 2 executes logarithmic number to real number conversion to permit wide range input signal processing. The voltage converter 3 obtains a voltage corresponding to the output of the log amplifier 2. The A/D converter 4 converts the analog output voltage of the voltage converter 3 to a corresponding digital value. The operational circuit 5 executes operation to be described later on the basis of the digital output of the A/D converter 4. The memories A6, B7 and C8 serve to store the result of operation in the operational circuit 5. The controller 9 controls the operational circuit 5 and the memories A6 to C8. The detected input power level display 10 displays input power level, etc. The I/F 11 serves as interface with a personal computer (PC) or like external circuit.

Two electric fields A and B at different levels are inputted from the antenna 20. The A/D converter 4 digitally converts the input power levels of the two electric fields to digital values. The operational circuit 5 executes an operation of solving simultaneous equations according to the input digital values and prepares an input power level conversion table of digital values versus detected input power level display values. As is well-koonwn, this level conversion table is made according to the linear equation. In the linear equation, the input electric field E is expressed by the linear equation and is obtained by multiplying the digital value AD of the input electric field by a constant (gain G) and adding an off-set value OFF to the multiplied result as showm in the following:

$$E=AD*G+OFF$$

Thus, if two sets of electric field values and the corresponding digital values are provided, the gain G and off-set OFF are obtained by solving the simultaneous equations. For the display adjustment (control), the levels of the electric fields A and B and also the corresponding digital values are stored in the memories A6 and B7, respectively, and the operational circuit 5 prepares the input power level conversion table according to the values stored in the memories A6 and B7. The table thus prepared is stored in the memory C8. After the adjustment, the digital values are subject to changes with the electric field levels inputted from the antenna 20. Accordingly, a pertinent detected input power level display value corresponding to the level of the inputted electric field is selected with reference to the table in the memory C8, and is displayed on the detected input power level display 10.

Figure 6:
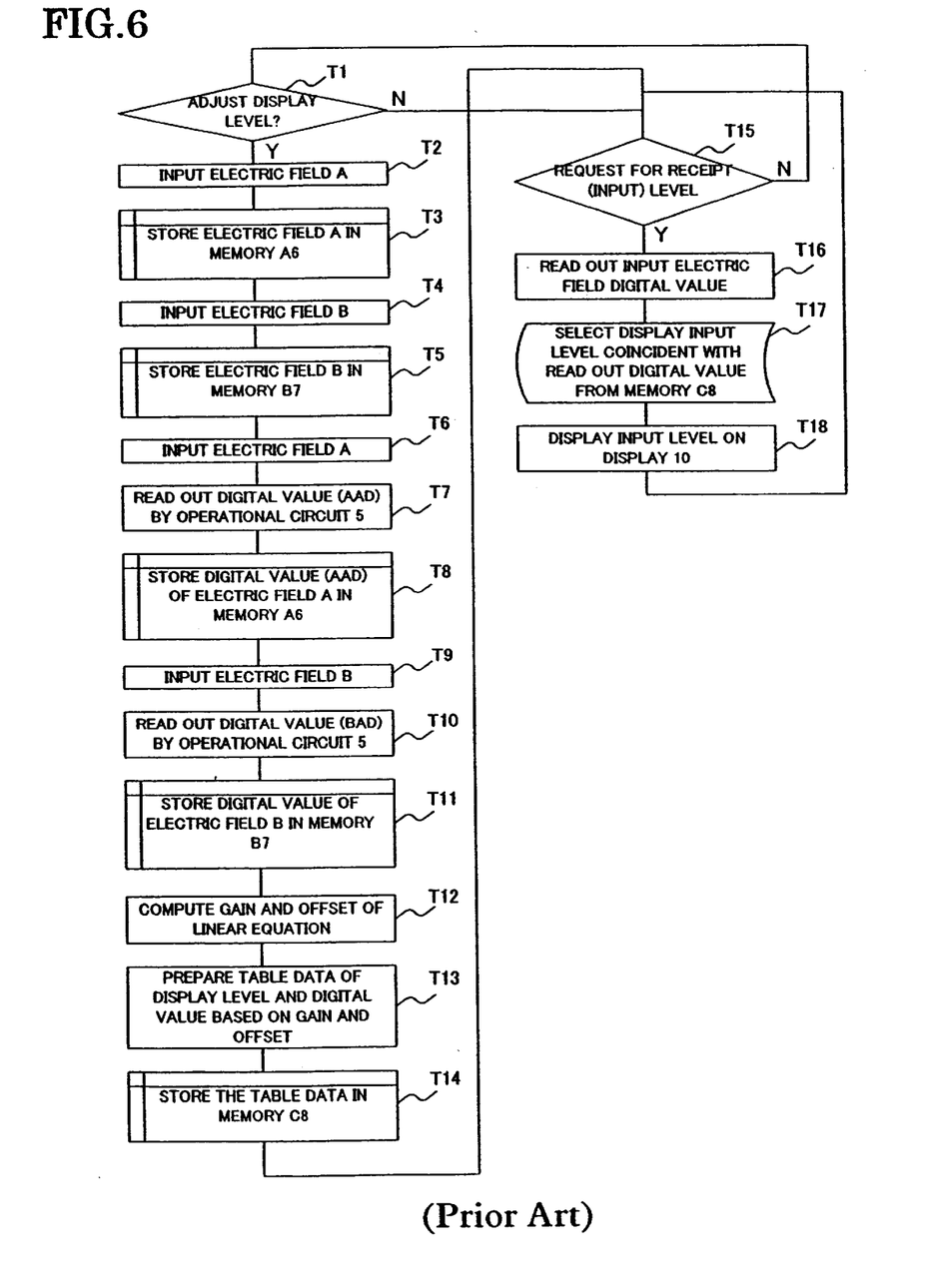
FIG. 6 is a flow chart illustrating the display control process in the prior art radio receiver

FIG. 6 is a flow chart illustrating the display level adjustment process in the prior art radio receiver as described above. In the process, a check is first executed as to whether the display level is to be adjusted (step T1). When adjusting the display level, the input power level of received electric field A is inputted from the I/F 11 (step T2), and is stored in the memory A6 (step T3). Then, the input power level of received electric field B is inputted from the I/F 11 (step T4), and is stored in the memory B7 (step T5). The received electric field A is then inputted from the antenna 20 (step T6). The operational circuit 5 then reads out the digital value (AAD) corresponding to the received electroc field A (step T7), and stores this value AAD in the memory A6 (step T8). Then, the received electric field B is inputted from the antenna 20 (step T9). The operational circuit 5 then reads out the digital value (BAD) corresponding to the received electric field B (step T10), and stores this value BAD in the memory B7 (step T11). The operational circuit 5 then solves the simultaneous equations using the levels of the received fields A and B and the corresponding digital values AAD and BAD, and computes linear gain and off-set satisfying the conditions thus obtained (step T12). Reception power level display values in 1:1 correspondence to all digital values, are then calculated from the gain and off-set data obtained in the operational circuit 5, and table data of the calculated input power level display values corresponding to the digital values are prepared (step T13), and are stored in the memory C8 (step 14).

When it is not decided in the above step T1 that the display level adjustment is to be executed, or after the step T14, a check is done as to whether input power level detection is to be requested (step T15). When requesting the input power level detection (Y), the operational circuit 5 reads out the digital values corresponding to the electric field levels at this time (step T16). When not requesting the input power level detection (N), the process returns to the step T1. Subsequent to the step S16, the input power level display values coincident with the read-out digital values are selected by accessing the memory C8 (step T17). Finally, the controller 9 causes display of the pertinent input power levels on the detected input power level display 10 (step T18), and then the process goes back to the step T15.

In the above prior art technique, however, the circuit for converting input power level to voltage processes input power levels in a wide range likewise as the voltage data. Therefore, level division is executed on CPU side, and a variable attenuator and a controller for controlling such variable attenuator should be provided. Besides, an interface for receiving the voltage data and feeding out the variable attenuator control data is necessary, causing complexity of circuit construction and control. Furthermore, the prior art technique described above with reference to FIGS. 5 and 6 poses a problem that sufficient linearity for the input power level display cannot be obtained.

SUMMARY OF THE INVENTION

An object of the present invention is to provide a radio receiver having sufficient linearity for the input power level display to be obtained at the high input power level electric field without any complication of the circuit construction and a method of the display level adjustinment.

According to an aspect of the present invention, there is provided a radio receiver, in which a input power level detected by an analog-to-digital converter for digitally converting a voltage from a voltage converter for converting a signal received from an antenna is displayed on a input power level display, comprising: a memory circuit for storing digital values AAD, BAD and CAD from the analog-to-digital converter when electric fields A, B and C, respectively, are received from the antenna; an operational circuit for obtaining a non-linearity corrected input power level conversion table by calculating input power levels from the digital values; a table memory circuit for storing the input power level conversion table; and a controller for displaying the input power level at the time of reception of each electric field by reading out the input power level conversion table in the table memory circuit.

The electric field C is a saturation starting point in the receiver circuit at high input power level electric field input time. The electric field C is a low input power level electric field input point subject to adverse effects of noise.

According to another aspect of the present invention, there is provided a method of displaying an input electric field level of a radio signal received by a radio receiver through an antenna on an input power level display using a conversion table which converts the input electric field level to a display value and is determined on the basis of two input electric field values under condition of which the receiver circuit is linearly operated, comprising the steps of: determining a corrected conversion table for correcting the non-linearity of the conversion table for an input electric field under condition of which the receiver circuit is not linearly operated on the basis of the two input electric field values and a specified electric field value under condition of which the receiver circuit is not linearly operated; and displaying the display value corresponding to the input electric field using the corrected conversion table.

According to other aspect of the present invention, there is provided a method of displaying an input electric field level of a radio signal received by a radio receiver through an antenna on an input power level display using a conversion table which converts the input electric field level to a display value and is determined on the basis of two input electric field values under condition of which the receiver circuit is linearly operated, comprising the steps of: determining a corrected conversion table for correcting the non-linearity of the conversion table for an input electric field under condition of which the receiver circuit is not linearly operated on the basis of the two input electric field values and a specified electric field value under condition of which the receiver circuit is not linearly operated; judging whether the input electric field value is higher than the specified electric field value, selecting the conversion table or the corrected conversion table in accordance with the judged result; and displaying the display value corresponding to the input electric field using the corrected conversion table.

The specified field value is predetermined by means of experiments or circuit design. The specified electric field value corresponds to that of the time of saturation of the receiver circuit due to an high input power level electric field or the time of reception of a weak electric field subject to adverse effects of noise. The corrected conversion table is determined by an input of predetermined instruction.

Other objects and features will be clarified from the following description with reference to attached drawings.

PREFERRED EMBODIMENTS OF THE INVENTION

Preferred embodiments of the present invention will now be described with reference to the drawings.

One of the utmost feature of the present invention resides in that, for correcting the input power level conversion table between the two electric field levels (hereinafter referred to as points A and B), obtained from these points A and B and the corresponding digital values (AAD and BAD) in the above prior art technique, a third electric field level (hereinafter referred to as point C) is inputted for input power level conversion table preparation by utilizing the corresponding digital value (CAD). The third point electric field level is such a level that the receiver part output turns to be distorted as the input electric field level exceeds it, that is, it is a level that saturation is brought about when it is reached. The corresponding digital value is preliminarily read out and stored in a memory. A input power level conversion table is thus prepared from the digital values (CAD) at the point C, stored in the memory, as well as the electric field levels at the points A and B and the corresponding digital values (ADD and BAD). It is thus possible to obtain an effect that highly accurate input power level display values are obtainable at the high input power level electric field input time without elaboration or complication of any circuit.

Figure 1:
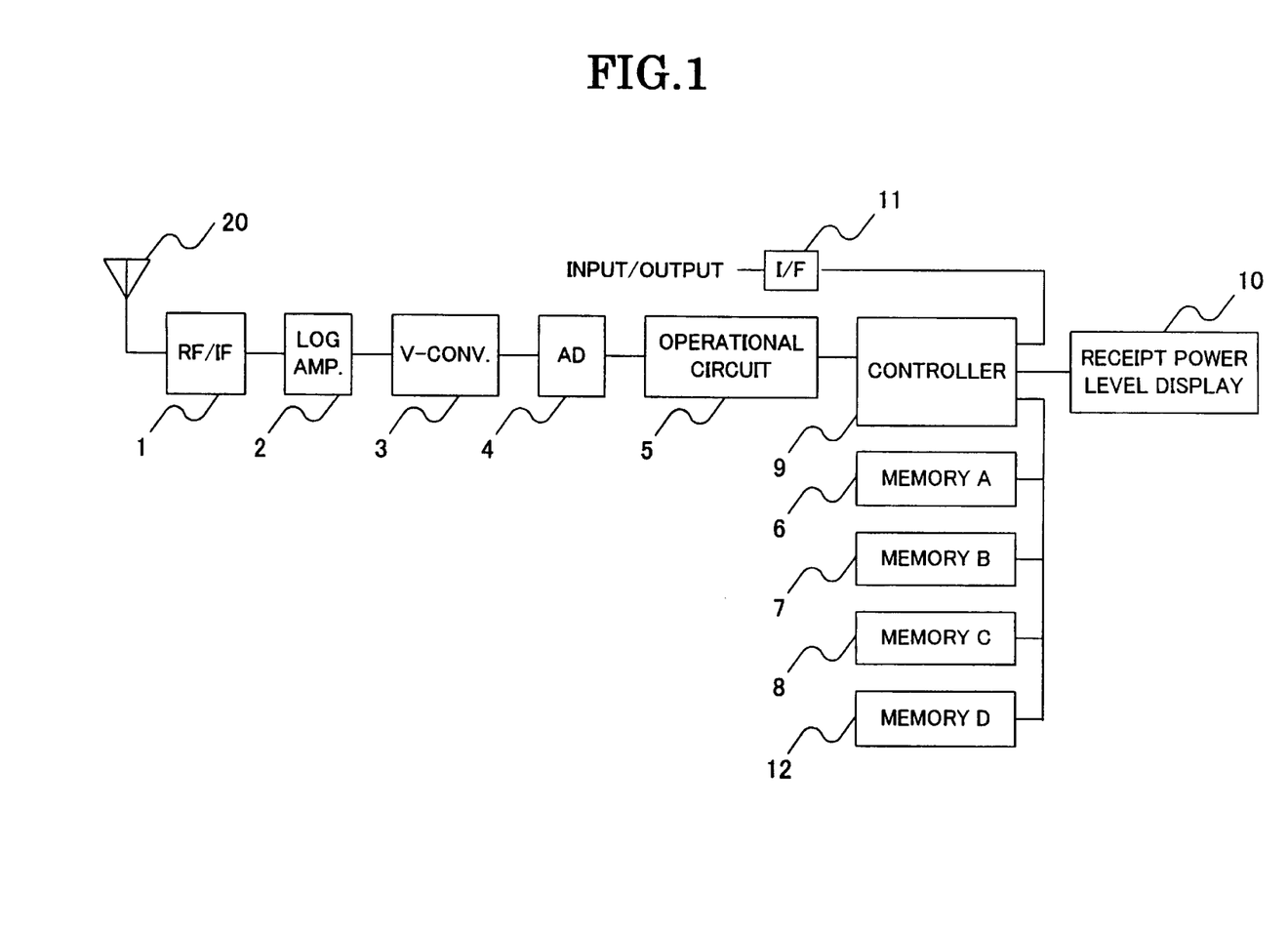
FIG. 1 is a block diagram showing the construction of a radio receiver according to the present invention.

FIG. 1 is a block diagram showing the construction of a radio receiver according to the present invention. In the Figure, parts like those in FIG. 5 are designated by like reference numerals for the brevity sake. The illustrated radio receiver (for instance portable telephone set) comprises an antenna 20, an RF/IF circuit 1, a log amplifier 2, a voltage converter 3, an A/D converter 4, an operational circuit 5, a memory A6, a memory B7, a memory C8, a memory D12, a controller 9, a input power level display 10 and an I/F 11. Compared to the prior art technique shown in FIG. 5, the embodiment thus has a main structural feature that it comprises the additional memory D 12.

An RF signal is inputted from the antenna 20 to the RF/IF circuit 1. The RF/IF circuit 1 amplifies the inputted RF signal, converts the amplified signal to an IF signal, and amplifies the IF signal to a predetermined level. The log amplifier 2 converts the IF conversion of the received signal from the RF/IF circuit 1 from logarithmic number level to real number level. This is executed so in that the RF signal, which is usually expressed in logarithmic number units (dBm), can be more readily operationally processed in real number units (V). The voltage converter 3 converts the output of the log amplifier 2 to a corresponding voltage. Usually, the log amplifier 2 and the voltage converter 3 are constructed together as a common circuit. The A/D converter 4 digitally converts the output voltage of the voltage converter 3 to a digital value. The operational circuit 5 executes predetermined operation with the digital data. For detected input power level display adjustment, the circuit 5 executes operation with data stored in the memories A6, B7, C8 and D12. The operational output data of the operational circuit 5 is fed out via the controller 9 to the input power level display 10, whereby input power level corresponding to the electric field received by the antenna 20 is displayed.

A detected input power level display method in a radio receiver will now be described. The input power level of electric field C, which is preliminarily determined by design or experiments to cause characteristic distortion of the RF/IF circuit 1 at high input power level electric field input time, is inputted from the antenna 20, and the corresponding digital value DAD obtained from the A/D converter 4 at this time, is stored in the memory D 12. Then, the operational circuit 5 prepares a input power level conversion table by executing calculations (solving the simultaneous equations) as in the above prior aet calculation. In the case of a digital value greater than the digital value stored in the memory D12, the circuit 5 rewrites the input power level conversion table by using a correction calculation formula, which is prepared for saturation correction. In the saturation correction method, the input power level display value is increased by 1 dB for every one bit increase of the digital value. As for the input power level of electric field C that constitutes a saturation level, an optimum electric field value for the correction is obtained in advance by calculating the electric field level causing characteristic distortion of the receiver circuit from receiver circuit design, experiments, etc.

In the above way, the input power level conversion table is prepared, and is stored in the memory C 8. The stored input power level conversion table is referred to whenever the input power level of an electric field inputted from the antenna 20 is displayed on the input power level display 10. While in the above description the input power level of an electric field inputted from the antenna 20 is displayed on the input power level display 10, it is well known to a person skilled in the art that inputting the input power level of an electric field from the I/F 11 leads to the same content.

Figure 2:
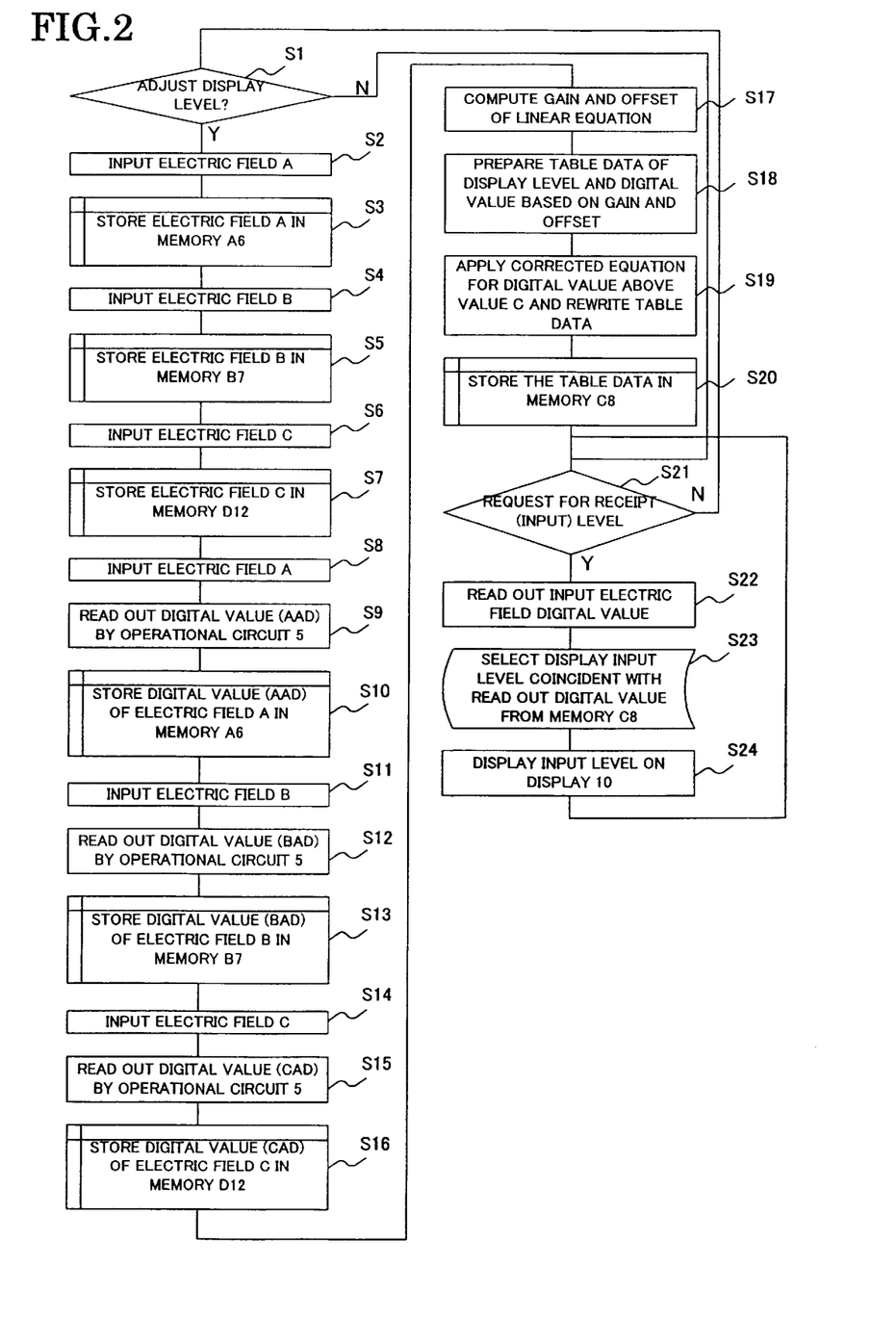
FIG. 2 is a flow chart of opeartion of the embodiment shown in FIG. 1.

The operation of the preferred embodiment of the present invention shown in FIG. 1 will now be described with reference to the flow chart of FIG. 2. First, a check is executed as to whether the display level is to be adjusted (step S1). Usually this step is executed by checking whether a desired command input from the I/F 11 is present. Input power levels of electric fields A, B and C that are necessary for the input power level conversion table preparation are inputted and stored in the memories A 6, B 7 and D 12, respectively, in advance. Specifically, the input power level of the electric field A has been inputted from the I/F 11 (step S2), and stored in the memory A6 (step S3). Also, the input power level of the electric field B has been inputted from the I/F 11 (step S4), and stored in the memory B7 (step S5). Then, the input power level of the electric field C has been inputted from the I/F 11 (step S6), and stored in the memory D12 (step S7).

Figure 3:
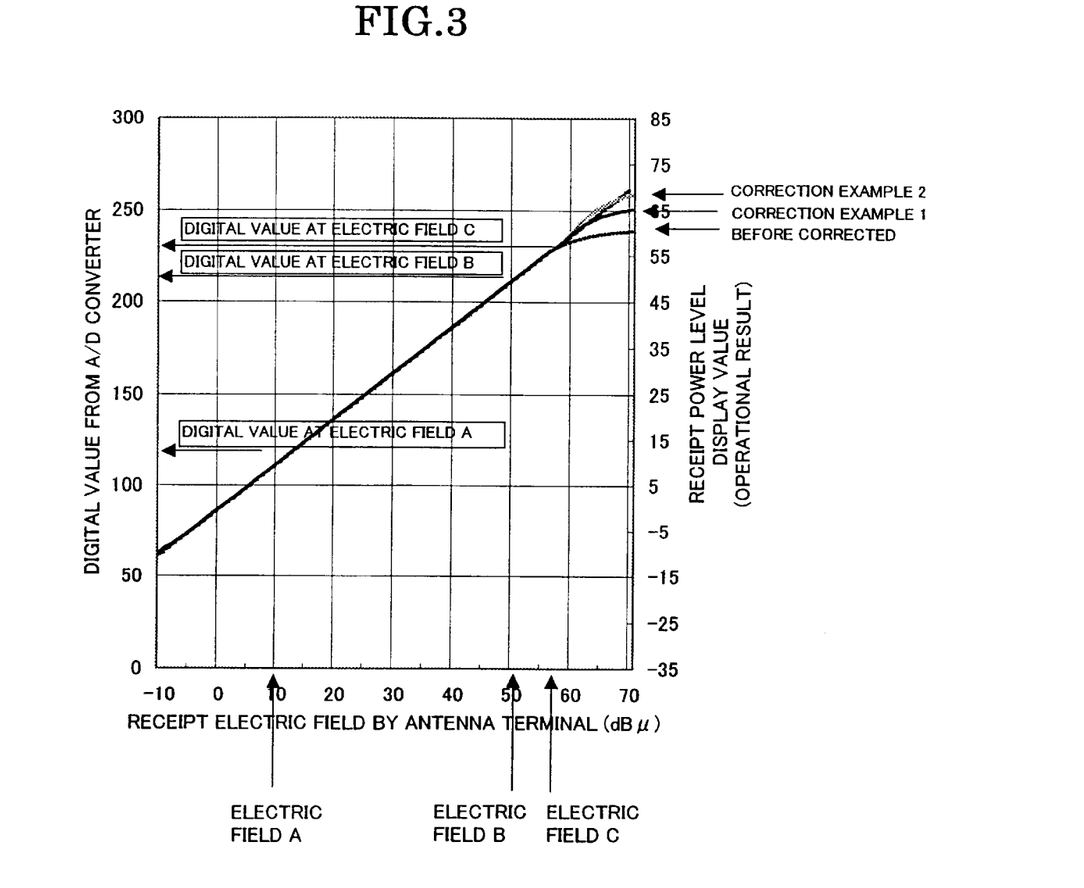
FIG. 3 shows the relationship among the input power levels of the electric fields A, B and C and the corresponding digital values AAD, BAD and CAD in the embodiment.

Now, the electric field A is inputted from the antenna 20 (step S8), and the corresponding digital value (AAD) at this time is read out from the A/D converter 4 (step S9) and stored in the memory A6 (step S10). Then, the electric field B is inputted from the antenna 20 (step S11), and the corresponding digital value (BAD) at this time is read out (step S12) and stored in the memory B7 (step S13). Subsequently, the input power level of the electric field C is inputted from the antenna 20 (step S14), and the corresponding digital value (CAD) is read out (step S15) and stored in the memory D12 (step S16). FIG. 3 shows the relationship among the input power levels of the electric fields A, B and C and the corresponding digital values AAD, BAD and CAD.

The input power level of the electric field C and the corresponding digital value CAD is used as saturation correction threshold data and is thus called as such. When necessary data have been stored in the memories A6, B7 and C12, the operational circuit 5 executes the similar operational processing to obtain the input level conversion table, as described in the foregoing by using the data (i.e., input power levels of the electric fields A, B and C and corresponding digital values AAD, BAD and CAD) stored in the memories A6, B7 and D12. First the operational circuit 5 computes the gain and off-set of the linear equation, suited for values less than the saturation correction threshold (step S17). Then the circuit 5 prepares the linear table of input power level display values corresponding to all the digital values (step S18). Subsequently, for the correction of values above the saturation correction threshold, the circuit rewrites the table data by calculating the correction equation for the values above the saturation correction threshold value (CAD) corresponding to the input power level of the electric field C from the transient linear table. The correction formula is such that the input power level display value increases by one dB for every one bit increase of the digital value. When the digital value is above the value CAD, the circuit 5 prepares a corrected input power level conversion table inclusive of the correction formula for all the digital values from the data as obtained above by applying the correction formula (step S19). The corrected input power level conversion table thus prepared is stored in the memory C8 (step S20). In the above way, an input power level conversion table as shown by the curve of Correction Example 1 shown in FIG. 3 is prepared. Subsequently, the input power levels are displayed with reference to this input power level conversion table stored in the memory C8. In the conversion table (equation), compared to the non-corrected characteristic, the display level is raised to correct the reduction of the display level.

A detected input power level display process will now be described. First, a check is executed as to whether input power level detection has been requested (step S21). When input power level detection has been requested from a base station or at a predetermined input power level detection timing of the ratio unit (or portable telephone set), the digital value at thus instant is read out form the A/D converter 4 (step S22). The operational circuit 5 then accesses the memory C 8 via the controller 9, and selects the corresponding input power level display value with reference to the read-out digital value (step S23). More specifically, the foregoing linear conversion table or corrected conversion table is selected in accordance with whether the digital value of the input electric field is less than that of the electric field C corresponding to the saturation level. The controller 6 then causes display of the pertinent input power level on the input power level display 10 (step S24).

While in the above embodiment the steps S2 and S3 are executed right before the step S4, it is obviously possible to execute the steps S2 and S3 right before the step S12.

A different embodiment of the present invention will now be described. This embodiment is the same in basic construction as the above preferred or first embodiment, but it is set apart in further contrivance in the saturation correction. Specifically, in the saturation correction, instead of increasing the input power level display value by one dB for every one bit increase of the read-out digital value, the power to a certain value of the difference between the read-out digital value and the saturation correction value is displayed as the corrected power level. Thus, in this embodiment an input power level conversion table as in Correction Example 2 shown in FIG. 3 is prepared. It will be seen that in this second embodiment since the range for keeping the corrected input (received) level accuracy can be expanded, the apparent total gain of the receiver circuit can be increased by saturation correction even when the total gain is lower. Thus, it is possible to enhance the truth of the input power level display and expand the scope of design without taking the total gain into any consideration.

Figure 4:
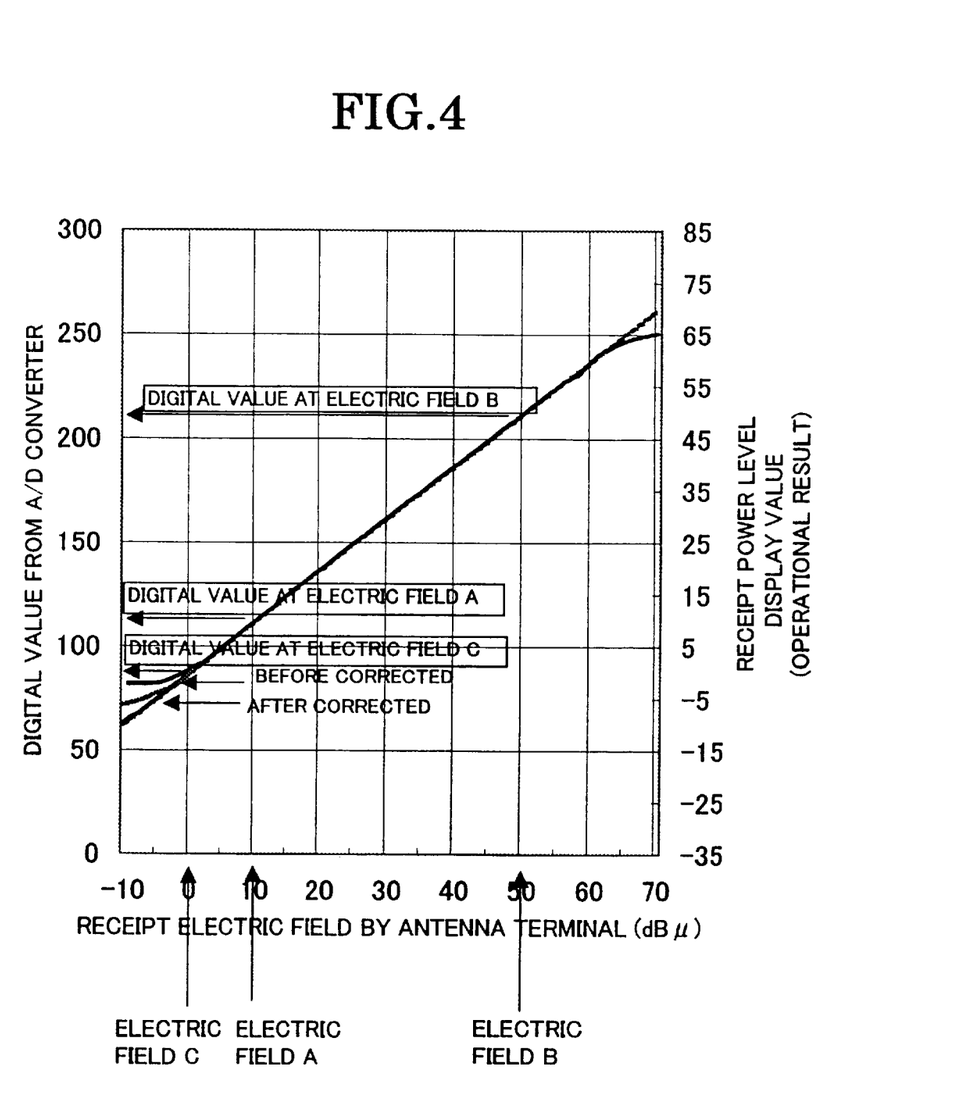
FIG. 4 shows the relationship among the input power levels of the electric fields and the corresponding digital values in the another embodiment.

The above embodiments are based on the concept of improving the non-linearity due to circuit characteristics distortion by saturation correction. The same concept is applicable to the time of input of a low input level electric field near the noise level in the receiver circuit. At this time, like the high input power level electric field input time, saturation is brought about as a lower limit is imposed on voltage by noise. Thus, correction of values below the saturation threshold value may be executed such as to improve apparent accuracy improvement in the neighborhood of the noise level. A third embodiment of the present invention, in which such correction is executed, is shown in FIG. 4. In this embodiment, the correction formula is applied to the digital values less than the saturation threshold value. The correction method is the same as in the above first and second embodiment except for that the input power levels are corrected toward the negative side instead of the positive side, and it will not be described in further detail. It is thus possible to obtain linearity improvement over the prior art input level display and higher accuracy of the input power level display at low level electric field input time as well.

Furthermore, a fourth embodiment of the present invention is obtainable by combining the first and third embodiments. In this embodiment, saturation threshold values are provided for both upper and lower input power levels for simultaneous saturation correction at low and high input power level electric field input times. This fourth embodiment is obvious from the above description, and it will not be described in detail.

As has been described in the foregoing, according to the present invention it is possible to improve the linearity of the detected input power level display by utilizing and according to A/D converter output data and without provision of any addition circuit.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A radio receiver, in which a input power level detected by an analog-to-digital converter for digitally converting a voltage from a voltage converter for converting a signal received from an antenna is displayed on a input power level display, comprising:

a memory circuit for storing digital values AAD, BAD and CAD from the analog-to-digital converter when electric fields A, B and C, respectively, are received from the antenna; an operational circuit for obtaining a non-linearity corrected input power level conversion table by calculating input power levels from the digital values;

a table memory circuit for storing the input power level conversion table; and a controller for displaying the input power level at the time of reception of each electric field by reading out the input power level conversion table in the table memory circuit, wherein the electric field C is a saturation starting point in the receiver circuit at high input power level electric field input time.

2. The radio receiver according to claim 1, wherein the electric field C is a low input power level electric field input point subject to adverse effects of noise.

3. A method of displaying an input electric field level of a radio signal received by a radio receiver through an antenna on an input power level display using a conversion table which converts the input electric field level to a display value and is determined on the basis of two input electric field values under condition of which the receiver circuit is linearly operated, comprising the steps of:

determining a corrected conversion table for correcting the nonlinearity of the conversion table for an input electric field under condition of which the receiver circuit is not linearly operated on the basis of the two input electric field values and a specified electric field value under condition of which the receiver circuit is not linearly operated; and displaying the display value corresponding to the input electric field using the corrected conversion table, wherein the specified field value is predetermined by means of experiments or circuit design.

4. A method of displaying an input electric field level of a radio signal received by a radio receiver through an antenna on an input power level display using a conversion table which converts the input electric field level to a display value and is determined on the basis of two input electric field values under condition of which the receiver circuit is linearly operated, comprising the steps of:

determining a corrected conversion table for correcting the nonlinearity of the conversion table for an input electric field under condition of which the receiver circuit is not linearly operated on the basis of the two input electric field values and a specified electric field value under condition of which the receiver circuit is not linearly operated; and displaying the display value corresponding to the input electric field using the corrected conversion table, wherein the specified electric field value corresponds to that of the time of saturation of the receiver circuit due to an high input power level electric field or the time of reception of a weak electric field subject to adverse effects of noise.

5. A method of displaying an input electric field level of a radio signal received by a radio receiver through an antenna on an input power level display using a conversion table which converts the input electric field level to a display value and is determined on the basis of two input electric field values under condition of which the receiver circuit is linearly operated, comprising the steps of:

determining a corrected conversion table for correcting the non-linearity of the conversion table for an input electric field under condition of which the receiver circuit is not linearly operated on the basis of the two input electric field values and a specified electric field value under condition of which the receiver circuit is not linearly operated;

judging whether the input electric field value is higher than the specified electric field value, selecting the conversion table or the corrected conversion table in accordance with the judged result; and displaying the display value corresponding to the input electric field using the corrected conversion table, wherein the specified field value is predetermined by means of experiments or circuit design.

6. A method of displaying an input electric field level of a radio signal received by a radio receiver through an antenna on an input power level display using a conversion table which converts the input electric field level to a display value and is determined on the basis of two input electric field values under condition of which the receiver circuit is linearly operated, comprising the steps of:

determining a corrected conversion table for correcting the non-linearity of the conversion table for an input electric field under condition of which the receiver circuit is not linearly operated on the basis of the two input electric field values and a specified electric field value under condition of which the receiver circuit is not linearly operated;

judging whether the input electric field value is higher than the specified electric field value, selecting the conversion table or the corrected conversion table in accordance with the judged result; and displaying the display value corresponding to the input electric field using the corrected conversion table, wherein the specified electric field value corresponds to that of the time of saturation of the receiver circuit due to an high input power level electric field or the time of reception of a weak electric field subject to adverse effects of noise.

* * * * *